United States Patent [19]
Sommese et al.

[11] Patent Number: 6,083,404
[45] Date of Patent: Jul. 4, 2000

[54] METHOD OF DEWATERING DIFFICULT SLUDGES

[75] Inventors: Anthony G. Sommese, Aurora; Jitendra Shah, Naperville, both of Ill.

[73] Assignee: Nalco Chemical Company, Naperville, Ill.

[21] Appl. No.: 09/156,820

[22] Filed: Sep. 18, 1998

[51] Int. Cl.$^7$ .................................. C02F 1/52; C02F 1/54
[52] U.S. Cl. .................. 210/723; 210/727; 210/728; 210/724; 210/735
[58] Field of Search .................................. 210/723, 726, 210/727, 728, 732, 734, 735

[56] References Cited

U.S. PATENT DOCUMENTS

| | | | |
|---|---|---|---|
| 4,062,779 | 12/1977 | Nakamura et al. | 210/386 |
| 4,382,864 | 5/1983 | Hashimoto et al. | 210/727 |
| 4,588,508 | 5/1986 | Allenson et al. | 210/708 |
| 5,779,910 | 7/1998 | Donlin | 210/726 |
| 5,846,433 | 12/1998 | Sorensen et al. | 210/709 |

OTHER PUBLICATIONS

WEFTEC '97 Proceedings from Residual & Biosolids Management vol. 2, p.p. 299–309 (1997).
"Dewaterability of ATAD Sludges" Clyde Burnett, P.E. & Allen Woelke, P.E., Camp Dresser & McKee Inc. Steven Dentel, Ph.D., P.E., University of Delaware.

*Primary Examiner*—David A. Simmons
*Assistant Examiner*—Betsey J. Morrison
*Attorney, Agent, or Firm*—Kelly L. Cummings; Thomas M. Breininger

[57] ABSTRACT

The present invention provides a new method for dewatering difficult sludges, such as autothermal thermophilic aerobic digestion sludges. The method incorporates a three-component treatment system. Initially, the difficult sludge is dosed with an inorganic coagulant and then the resulting sludge-inorganic mixture is dosed with a microparticle component. Lastly, the resulting mixture is dosed with a high molecular weight flocculant.

11 Claims, No Drawings

METHOD OF DEWATERING DIFFICULT SLUDGES

BACKGROUND OF THE INVENTION

The present invention relates to the dewatering of sludges. More specifically, the present invention relates to the dewatering of difficult sludges, such as sludges derived from an autoheated thermophilic aerobic digestion system (ATAD).

Biosolids are a byproduct of waste water treatment which have been recognized as a valuable commodity. Before sludge can be returned into the natural cycle, an adequate treatment for stabilization and pathogen reduction is required. The United States Environmental Protection Agency has established standards for both goals. One highly effective technology for achieving a high degree of pathogen reduction is autothermal thermophilic aerobic digestion ("ATAD").

Such ATAD systems have been operating at full-scale in Europe for over twenty years. Currently, there are over fifteen systems in the United States and at least five in Canada. The significant advantages of this waste treatment system will lead to further installations throughout the world.

The ATAD process is an aerobic digestion process that operates in the thermophilic temperature range (40–80°) without supplemental heating. The thermophilic bacteria flourish at these elevated temperatures and have a much higher metabolism rate. This results in a faster rate of soluble organic destruction, when compared to conventional aerobic digestion. As these bacteria destroy the volatile organics, they release energy in the form of heat. The soluble organics are reduced to their lowest components: $CO_2$ and $H_2O$. Additionally, the high temperature of the system is effective in destroying pathogens. This process has the additional advantage of reducing the biomass volume. Up to 45% of the solids are destroyed after one week in an ATAD system. This degree of solids reduction is possible in an anaerobic digester after three weeks or in a conventional aerobic digester after two months.

Much interest has been generated over the past few years in the ATAD process and, as noted above, a number of ATAD systems are springing up in various parts of the United States. The reason is that the ATAD process is a cost effective method of achieving Class A standards of pathogen and vector attraction reduction as defined in the United States EPA 40 C.F.R. Part 503 sludge regulations. Class A sludge has reduced disposal restrictions compared with Class B sludge, which is the sludge produced from conventional aerobic and anaerobic digestion.

With more and more waste water authorities opting to treat sludge to Class A standards to ease disposal and simplify record keeping requirements, the ATAD process will undoubtedly become a more popular and widespread sludge stabilization technique in this country. In many cases, ATAD sludge is being dewatered to facilitate land application or other beneficial uses.

Unfortunately, although the ATAD process has served to be a beneficial digestion process, a major drawback of this type of digestion system is the inability to effectively dewater the sludge at a reasonable cost. On average, nearly a three-fold increase in polymer dosage is required to get effective flocculation and dewatering of ATAD sludges. For example, dewatering costs for conventional aerobically digested sludge ranges from $20–30/dry ton.

In contrast, a study conducted on behalf of an ATAD facility has reported that polymer dosage increased from $25/dry ton to an excess of $150/dry ton when the same polymer that was utilized previously for dewatering aerobically digested sludge was used for the dewatering of the ATAD sludge. See Burnett et al, "Dewaterability of ATAD Sludges," WEFTEC '97 Proceedings from Residual & Biosolids Management Vol. 2, p. 299–309 (1997). Indeed, the high polymer demand remained at this rate for several months, despite attempts at optimizing and reducing the polymer dose through conventional trial-and-error changes to feed point, holding time, and other parameters. Id. Because of the high cost of dewatering such ATAD sludges, many ATAD facilities are now forced to haul the sludge away to various land application sites for disposal.

Accordingly, a need exists for an improved method for dewatering difficult sludges, such as sludges derived from the ATAD process.

SUMMARY OF THE INVENTION

The present invention uniquely provides a method for dewatering difficult sludges, such as ATAD sludges and other digested sludges. The method incorporates a three-component treatment for the dewatering of such sludges. Initially, the sludge is dosed with an inorganic coagulant. Then, the sludge-inorganic mixture is dosed with a microparticle component. Lastly, the resulting mixture is dosed with a high molecular weight flocculant.

The inorganic coagulant component is utilized to obtain broad floc formation. Suitable types of inorganic coagulants include salts of aluminum, iron and zinc.

With the addition of the microparticle component, the inventors of the present invention have uniquely recognized an increase in the amount of free drainage achievable with the present application. This microparticle component can be either organic or colloidal in nature.

Lastly, after good floc formation is achieved with the first two components, the resulting mixture is dosed with a high molecular weight flocculant. This flocculant can be anionic, cationic or non-ionic in nature. Preferably, the high molecular weight flocculant is a polymer having a molecular weight greater than 5 million amu.

An advantage of the present invention is the ability to produce strong dewaterable floc in difficult sludges that can readily release water and can withstand the shear of mechanical dewatering.

Another advantage of the present invention is the ability to cost effectively dewater difficult sludges by producing strong floc formation at dosages lower than those often required in current flocculant programs.

Additional features and advantages of the present invention are described in, and will be apparent from, the detailed description of the presently preferred embodiments.

DETAILED DESCRIPTION OF THE PRESENTLY PREFERRED EMBODIMENTS

The present invention provides an improved method for dewatering difficult sludges, such as those derived from the ATAD digestion process. This process is unique in that it uses elevated temperatures and thermophilic bacteria to degrade the waste. Degradation is so efficient that one is left with very small particles, which need to be dewatered before land filling. These small particles have a large surface area and therefore require high dosages of polymer to overcome the physical forces, flocculate together and settle. The inventors have uniquely discovered that the method of the present invention allows for the cost effective dewatering of such sludges.

The method of the present invention includes a three-component treatment system. Initially, the difficult sludges, such as ATAD and other digested sludges, are dosed with an inorganic coagulant. The inorganic coagulant is utilized to form large networks that act to carry or sweep suspended particles with the network. Pursuant to the present invention, the inorganic coagulant is used to add body to the extremely small particles and initiates the flocculation of such particles.

Suitable types of inorganic coagulants that can be used in the method of the present invention include known metal salts, such as salts of aluminum, iron and zinc. These salts are effective because they build structure when added to water. Specifically, suitable chemicals that can be used for the inorganic coagulant include, for example, $FeCl_3$, $FeSO_4$, $AlCl_3$, Alum, $Al_2Cl_x(H_2O)_y$, $ZnCl_2$, $ZnCl_4$ and polyaluminum chloride.

After the addition of the inorganic coagulant, a microparticle component is added to the sludge-inorganic mixture. This microparticle component can either be organic or colloidal in nature. The inventors have uniquely discovered that the addition of a microparticle component increases the amount of free drainage. As one of skill in the art would recognize, for optimum solid/liquid separation, it is imperative to remove as much water as possible before the sludge goes through mechanical dewatering. The microparticle component of the present invention promotes this objective.

A variety of materials can be utilized for the microparticle component. For example, the microparticle component can be an organic polymer. Suitable organic polymers include, for example, polyacrylates, acrylamide/sodium acrylate (AcAm/NaAc) copolymers, polyacrylamidopropylaulfonic acid (poly AMPS), acrylamide/acrylamidopropylsulfonic acid (AcAm/AMPS) copolymers and terpolmers containing acrylamide/sodium acrylate/acrylamidopropylsulfonic acid (AcAm/NaAc/AMPS). Suitable organic polymers have a molecular weight ranging from 10,000 to 500,000. In an embodiment, the molecular weight of the organic polymer is less than 1 million amu (atomic mass units).

Alternative to the organic polymer, the microparticle component can be a colloidal inorganic material. Suitable types of inorganic materials include colloidal silica (varying particle sizes), colloidal zinc or aluminum, colloidal borosilicate, various clays (betonites, hectorites, smectites), colloidal aluminas and zincs and alum.

Once these initial two components act to form strong floc, a high molecular weight flocculant is added to the resulting mixture. As one of skill in the art would recognize, the high molecular weight flocculant is selected based on the characteristics of the sludge, namely the charge demand of the sludge. For this reason, the flocculant can be either anionic, cationic or non-ionic in nature. This final component to the treatment system acts to bring all of the particles together in the form of flocs.

An noted above, the flocculant of the present invention can possess a positive, neutral or negative charge based on the characteristics of the particular sludge being dewatered. Suitable types of positively charged monomers include, for example, dimethylaminoethyl acrylate methyl chloride salt (DMAEA.MCQ), dimethylaminoethylacrylate methyl sulfate salt (DMAEA.MSQ), dimethylaminoethylmethacrylate methyl chloride salt (DMAEM.MCQ), dimethylaminoethylacrylate benzyl chloride salt (DMAEA.BCQ), dimethylaminoethymethacrylate methyl sulfate salt (DMAEM.MSQ), acrylamidopropyltrimethylammonium chloride (APTAC), methacrylamidopropyltrimethylammonium chloride (MAPTAC), diallyldimethylammonium chloride (DADMAC) and 2- and 4-vinylpyridine. Whereas, suitable types of negatively charged monomers include, for example, sodium acrylate (NaAc), sodium acrylamidopropylsulfonic acid (NaAMPS) and sodium methacrylate (NaMAc). Lastly, suitable types of neutral monomers include, for example, acrylamide (AcAm), methacrylamide (MAcAm), all of the esters and amides of acrylic and methacrylic acid, vinyl pyrrolidone and N-vinylformamide. Pursuant to the present invention, the flocculant can be a homopolymer of any of these monomers, but more preferably the flocculant is a copolymer with acrylamide.

The flocculant of the present invention is preferably a high molecular weight flocculant polymer. Suitable flocculant polymers have a molecular weight ranging from 1 million to 25 million amu. In an embodiment, the molecular weight of the organic polymer is greater than 5 million amu.

In most circumstances, since biological sludges possess a negative charge, the flocculants utilized in the present invention will be cationic in nature. Once again, however, the flocculant is chosen based on the charge demand of the sludge. The determination of charge is done through the testing of a variety of flocculants and observing which flocculants produce the best floc and release the most water.

By way of example, and not limitation, experimental testing demonstrating the effectiveness of the method of the present invention will now be given.

GENERAL TESTING PROCEDURE

The standard mode of testing utilized in the following experimental examples was the standard free drainage test. In general, 200 ml of sludge was added to a 500 ml graduated cylinder. Polymer was then added to the sludge as was dilution water to make the volume consistent. The cylinder was then capped and inverted a number of times until flocs began to form and water appeared to break away from the flocculated sludge. The sludge was then poured over a piece of fabric and the volume of water was collected. The volume of water was recorded at 5, 10 and 15 seconds. This simulates the free drainage zone on the belt press. In addition, the cake stability was examined to see if more water could be squeezed from same. Essentially, a positive result was obtained if good floc formation was achieved, a large volume of water was released and drained in the shortest period of time and more water is obtainable from squeezing the cake.

EXPERIMENTAL EXAMPLE NO. 1

Example 1. An ATAD sludge from a Southwestern Municipal facility

The sludge was treated with conventional high charged cationic flocculants, like Nalco® 7194 Plus and Nalco® 7139 Plus, at various dosages. Also added to this sludge, before polymer addition, was 5000 ppm of Alum. The drainage results are contained in Table 1. Poor free drainage was observed.

TABLE 1

| | Free Drainage (ml water/10 sec) | |
|---|---|---|
| Dosage (ppm) | N-7194 Plus | N-7139 Plus |
| 350 | 22 | 15 |
| 450 | 30 | 20 |
| 550 | 28 | 25 |

The same sample of sludge, with 5000 ppm alum, was treated according to the methods of this invention. Table 2, summarizes the results obtained using an inorganic microparticle. Keeping the flocculant constant, the amount of inorganic microparticle was varied. The microparticle (Nalco® 1034A) for Table 2, was colloidal silica. The free drainage was then recorded. A significant increase in free drainage was observed with the microparticle treatment.

TABLE 2

| Microparticle Dosage (ppm) | Free Drainage (ml water/10 sec) | |
|---|---|---|
| | N-7194 Plus @ 450 ppm | N-7139 Plus @ 450 ppm |
| 0 | 30 | 20 |
| 150 | 66 | 68 |
| 250 | 62 | 74 |
| 350 | 60 | 70 |

Again the same sample of sludge was treated according to the methods of this invention. Table 3, summarizes the results obtained using an organic microparticle, Nalco® 8677. Keeping the flocculant constant, the amount of organic microparticle was varied. The free drainage was then recorded. A significant increase in free drainage was observed with the microparticle treatment.

TABLE 3

| Microparticle Dosage (ppm) | Free Drainage (ml water/10 sec) | |
|---|---|---|
| | N-7194 Plus @ 450 ppm | N-7139 Plus @ 450 ppm |
| 0 | 30 | 20 |
| 150 | 58 | 64 |
| 250 | 60 | 68 |
| 350 | 66 | 72 |

Almost a 4-fold increase in drainage was observed when the microparticle program was employed. A significant improvement in floc structure and cake pressability was observed when this program was employed.

EXPERIMENTAL EXAMPLE NO. 2

Example 2. ATAD Sludge from a Southwestern Chemical Processing Plant.

The sludge was treated with conventional high charged anionic flocculants, Nalco® 9878 and 95LP073, at various dosages. Also added to this sludge, before polymer addition, was enough aluminum chlorohydrate to bring the sludge pH to 5.5. The drainage results are contained in Table 4. Good free drainage was observed only at high polymer dosages.

TABLE 4

| Dosage (ppm) | Free Drainage (ml water/10 sec) | |
|---|---|---|
| | Nalco® 9878 | Nalco® 95LP073 |
| 250 | 22 | |
| 500 | 64 | 50 |
| 750 | 76 | 50 |
| 1000 | 79 | 50 |
| 1250 | 83 | |

The same sample of sludge was treated according to the methods of this invention. Table 5, summarizes the results obtained using an inorganic microparticle. Keeping the microparticle dosage constant, the amount of flocculant was varied and the amount of free drainage recorded. The microparticle for Table 2, was colloidal silica, Nalco® 1115.

TABLE 5

| Nalco®-9878 Dosage (ppm) | Free Drainage (ml water/10 sec) Nalco® 1115 @ 50 ppm |
|---|---|
| 250 | 32 |
| 500 | 99 |
| 750 | 95 |
| 1000 | 77 |

Again the same sample of sludge was treated according to the methods of this invention. Table 6, summarizes the results obtained using an organic microparticle, Nalco® 8677. Keeping the flocculant constant, the amount of organic microparticle was varied. The free drainage was then recorded. A significant increase in free drainage was observed with the microparticle treatment.

TABLE 6

| Nalco® 95LP073 Dosage (ppm) | Free Drainage (ml water/10 sec) Nalco® 8677 @ 500 ppm |
|---|---|
| 500 | 66 |
| 750 | 65 |
| 1000 | 64 |

A 30% improvement in free drainage was observed when the microparticle program was employed. Floc structure and especially cake pressability, were improved when this program was employed.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A method for dewatering a difficult sludge containing small particles comprising the steps of:

dosing the sludge with an inorganic coagulant to form a first mixture;

dosing the first mixture with an anionic microparticle to form a second mixture;

dosing the second mixture with a flocculant to form a third mixture; and dewatering the third mixture.

2. The method of claim 1 wherein the sludge is derived from an autothermal thermophilic aerobic digestion system.

3. The method of claim 1 wherein the inorganic coagulant is selected from the group consisting of: $FeCl_3$, $FeSO_4$, $AlCl_3$, Alum, $Al_2Cl_x(H_2O)_y$, $ZnCl_2$, $ZnCl_4$ and polyaluminum chloride.

4. The method of claim 1 wherein the microparticle is selected from the group consisting of: an organic polymer and a colloidal inorganic material.

5. The method of claim 4 wherein the organic polymer is selected from the group consisting of polyacrylates, poly (meth)acrylates, acrylamide/sodium acrylate copolymers, acrylamide/sodium(meth) acrylate copolymers, acrylamide/acrylamido-propylsulfonic acid copolymers and terpolymers of acrylamide/acrylamido-propylsulfonic acid/sodium acrylate.

6. The method of claim 4 wherein the colloidal inorganic material is selected from the group consisting of: colloidal silica; colloidal zinc; colloidal aluminum, colloidal borosilicate, betonites, hectorites, smectites, colloidal aluminas; and colloidal zincs.

7. The method of claim 4 wherein the microparticle is an organic polymer with a molecular weight of less than 1 million amu.

8. The method of claim 1 wherein the flocculant is selected from the group of cationic charged flocculants consisting of poly(DMAEM.MCQ), poly(DMAEA.MCQ), acrylamide/DMAEA.MCQ copolymers, acrylamide/DMAEM.MCQ copolymers, acrylamide/APTAC copolymers, acrylamide/MAPTAC copolymers, acrylamide/DADMAC copolymers, acrylamide/DADMAC/DMAEA.MCQ terpolymers, AcAm/DMAEA.BCQ/DMAEA.MCQ terpolymers, copolymers of vinylamine/vinylformamide.

9. The method of claim 1 wherein the polymer flocculant is selected from the group of non-charged flocculants consisting of polyacrylamides, polyvinylpyrrolidone, polyvinylformamides, and polyacrylic acid.

10. The method of claim 1 wherein the flocculant has a molecular weight of greater than 1 million amu.

11. The method of claim 1 wherein the flocculant is selected from the group of anionic charged flocculants consisting of polyacrylates, poly(meth)acrylates, acrylamide/sodium acrylate copolymers, acrylamide/sodium(meth) acrylate copolymers, acrylamide/acrylamido-propylsulfonic acid copolymers and terpolymers of acrylamide/acrylamido-propylsulfonic acid/sodium acrylate.

* * * * *